United States Patent [19]
Gatten
[11] Patent Number: 5,068,806
[45] Date of Patent: Nov. 26, 1991

[54] METHOD OF DETERMINING USEFUL LIFE OF CARTRIDGE FOR AN INK JET PRINTER

[75] Inventor: Ronald A. Gatten, Pleasanton, Calif.
[73] Assignee: Spectra-Physics, Inc., San Jose, Calif.
[21] Appl. No.: 280,781
[22] Filed: Dec. 2, 1988
[51] Int. Cl.[5] .......... G06F 15/20
[52] U.S. Cl. .......... 395/113; 346/140 R
[58] Field of Search .......... 364/519, 520; 346/140 R, 75; 101/202, 210, 301, 324, 333; 355/208

[56] References Cited

U.S. PATENT DOCUMENTS

| | | | |
|---|---|---|---|
| 4,202,267 | 5/1980 | Heinzl et al. | 101/364 |
| 4,639,738 | 1/1987 | Young et al. | 346/75 |
| 4,788,861 | 12/1988 | Lichti | 346/140 R X |
| 4,963,927 | 10/1990 | Ishihara | 355/207 |

OTHER PUBLICATIONS

Hewlett Packard Journal, May 1985, Thermal Ink-Jet Printhead, pp.2-40.
Hewlett Packard Thermal Ink-Print Cartridge Designer's Guide, Second Edition.

*Primary Examiner*—Heather R. Herndon
*Attorney, Agent, or Firm*—Killworth, Gottman, Hagan & Schaeff

[57] ABSTRACT

A computer program in the microcontroller of an ink jet printer-plotter counts the ink dots fired by the cartridge of the printer. The host system keeps the dot count in nonvolatile memory. When the number of dots corresponding to the nominal capacity of the cartridge has been fired, a message is printed by the printer reminding the operator to provide a fresh cartridge.

33 Claims, 8 Drawing Sheets

PRIOR ART

Part of Data input interrupt routine:
MOREDOTS is written out to a bit on the status line to the Z80 system processor.

When this bit is on, the system processor adds one to its ink count. When this count exceeds a predetermined amount, the system will indicate to the operator the need for a new ink cartridge. This will be done at System Initialization or as part of the response to a status inquiry. The printer processor then executes the following code to subtract 4096 (1000h) from its total; If the result is less than 4096, the MOREDOTS signal is turned off.

```
GETD1:
      JNB   MOREDOTS, GETD2        If More Dots Flag On,Then Do
      CLR   EA                     Disable Interrupts
      PUSH  ACC                    And Save ACC on Stack
      MOV   A,DOT_TOTAL+1          Subtract 1000h from DOT_TOTAL
      CJNE  A,#10H,GETD1A
GETD1A:
      JNC   GETD1B
      DEC   DOT_TOTAL
GETD1B:
      ADD   A,#-10H
      MOV   DOT_TOTAL+1,A          If DOT_TOTAL .1t. 1000h
      ANL   A,#0F0H
      ORL   A,DOT_TOTAL
      JNZ   GETD1C
      CLR   MOREDOTS               Then, Clear More Dots Flag
GETD1C:
      POP   ACC                    Restore ACC
      SETB  EA                     And enable Interrupts
GETD2:
```

End of Dot Count processing in interrupt routine.

FIG-3A

At this point in the routine to process one column of dots in printing a character, the registers A and B contain a 1 for each of the twelve dots which is on and a 0 for each one that is off. The DOT_COUNT routine is called 3 times, once for each group of 4 dots.

```
ANL     A,#0FH          Clear High Nibble of ACC
MOV     NEXTDOTS,B      Save BA in NEXTDOTS
MOV     NEXTDOTS+1,A
CALL    DOT_COUNT       Count Dots 1 thru 4
MOV     A,B             Complement Bits
SWAP    A               Count Dots 5 thru 8
CALL    DOT_COUNT
MOV     A,B             Count Dots 9 thru 12
CALL    DOT_COUNT
RET
```

FIG-3B

GET DOTS:
Purpose: Set up Ink Dot pattern for next step

The NEXTDOTS variable is first cleared to zero. If the OFFPAPER flag is on (signifying position before physical start of paper), the routine is exited. If the pen is off, then the routine is exited.

DFLOW is added to DOT_RATIO. If there is no overflow of DOT_RATIO, then the routine is exited. If there is overflow, the 128 is subtracted from DOT_RATIO.

If Double Dot Flag in DDENSE is on, then get the pattern for dot # DOT_SELECT - 1 by calling ONEDOT and put it in the high byte of NEXTDOTS.

Call ONEDOT to get the pattern for dot # DOT_SELECT and put it in the low byte of NEXTDOTS. Call ADDDOTS to add to DOT_TOTAL, check for DOT_TOTAL greater than 4095 and set MOREDOTS flag if it is.

Called by: NEXTPLOT
Subroutines Called: ONEDOT(2), ADDDOTS
Input Variables: DOT_RATIO, DFLOW, DDENSE, DOT_SELECT, Flags (OFFPAPER, APLFLAG, PEN)
Changed Variables: NEXTDOTS, DOT_RATIO

```
        CLR     A
        MOV     NEXTDOTS,A
        MOV     NEXTDOTS+1,A
        JB      OFFPAPER, GETDO5        If Not Off Paper, Then Do
        JNB     PEN, GETDO5
        MOV     A,DOT_RATIO
        ADD     A,DFLOW
        MOV     DOT_RATIO,A
        JNC     GETDO5
        ADD     A,#-128
        MOV     DOT_RATIO,A
        MOV     A,DDENSE
        MOV     C,ACC.3
        MOV     A,DOT_SELECT            ACC=Dot Select
        MOV     B,#1                    Dot Count=1
        JNC     GETDO2
        PUSH    ACC                     Save ACC
        INC     B                       Dot Count=2
        DEC     A
        CALL    ONEDOT                  Get Dot (ACC)
        MOV     NEXTDOTS,A              Next Dot=Dot (ACC)
        POP     ACC                     Restore Dot Position to ACC
GETDO2:
        CALL    ONEDOT                  Get Dot (ACC)
        MOV     NEXTDOTS+1,A            Next Dot+1=Dot (ACC)
        MOV     A,B                     ACC=Dot Count
        CALL    ADDDOTS
GETDO5:
        RET
```

FIG-3C

DOT_COUNT

Add Number of Dots in Low Nibble of ACC to DOT_TOTAL. The low nibble of the accumulator is used to address the table DOTCTABLE which gives the number of ones in a 4 bit pattern.

```
        ANL     A,#0FH              Mask Low Nibble
        ADD     A,#DOTCTABLE-$-3    Point to Dot Count Table
        MOVC    A,@A+PC             ACC=Dot Count
FALL    INTO    ADDDOTS
```

The ADDDOTS routine is then called to add this number from 0 to 4 to the DOT_TOTAL. The DOT_TOTAL is then checked for a value greater than 4095, if greater, then the MOREDOTS signal is turned on to pass this count on to the Z80 system processor.

```
ADDDOTS:

        ADD     A,DOT_TOTAL+2       Dot Total=Dot Total+ACC
        MOV     DOT_TOTAL+2,A
        JNC     ADDO2
        INC     DOT_TOTAL+1
        MOV     A,DOT_TOTAL+1
        JNZ     ADDO1
        INC     DOT_TOTAL
ADDO1:
        ANL     A,#0F0H             If Dot Total .ge. 1000h
        ORL     A,DOT_TOTAL
        JZ      ADDO2
        SETB MOREDOTS       Then, Turn on More Dots Flag
ADDO2:
        RET                         Return

DOTCTABLE:                          Bit Count In 4 Bit Nibble
Purpose: Table of Dot Counts in a 4 Bit Nibble
Used by: DOT_COUNT

        DB      0                   0
        DB      1                   1
        DB      1                   2
        DB      2                   3
        DB      1                   4
        DB      2                   5
        DB      2                   6
        DB      3                   7
        DB      1                   8
        DB      2                   9
        DB      2                   10
        DB      3                   11
        DB      2                   12
        DB      3                   13
        DB      3                   14
        DB      4                   15
```

FIG-3D

Assembly language code:

```
        ARRIVE HERE AS A RESULT OF INTERRUPT FROM 8051/52

KXMITO                                  PRIOR TO KXMITO:
                                    PREVENT MULTIPLE RETI'S/INT.
        PUSH AF                     SAVE OVERWRITTEN REG'S<+1[DI]
        PUSH BC                                          <+2[DI]
        PUSH HL                                          <+3[DI]
        IFNZ      INKJET
        IN        A,(PPADIN)
        RES       O,A               DEBUG ONLY, REMOVE AFTER
                                    DEVELOPMENT
        LD        (PRSTATUS),A      DEBUG ONLY, PRSTATUS, BIT 0=0
                                    AFTER INTERRUPT
        BIT       4,A               SEE IF INK COUNT INCREMENT
        JR        Z,KXMITO1         JP IF NOT
        LD        HL,(INKCOUNT)     YES, INCREMENT IT
        LD        BC,1
        ADD       HL,BC
        JR        C,KXMITO1         BUT DO NOT OVERFLOW TO ZERO
        LD        (INKCOUNT),HL
KXMITO1:BIT       5,A               SEE IF SENDING OF NORMAL DATA IS
                                    SUPPRESSED
        JR        Z,KXMITO2         JP IF NOT, I.E. NORMAL INTERRUPT
```

BASIC language code to check count and print message if count of used ink is above limit:

```
4844 AF=CALL #124:IF2PEEK#FF82>2441THENLCD"INK LOW":!"INK LOW - CHANGE
PRINT CARTRIDGE AND PRESS [CTRL-SHIFT-C]"
```

BASIC language code to reset counter and give message to indicate change of cartridge:

```
2334POKE#FF82,0,0P:!ECHO"INK COUNTER IS RESET":END
```

FIG-3E

METHOD OF DETERMINING USEFUL LIFE OF CARTRIDGE FOR AN INK JET PRINTER

BACKGROUND OF THE INVENTION

1. Field of the Invention

This invention relates to ink jet printers, such as are typically used with computers and scientific instruments.

2. Description of the Prior Art

Ink jet printers, one type being thermal ink jet printers, are well known in the art, and are commonly used with personal computers and with scientific instruments. When used with scientific instruments, the printers are often called "printer-plotters". Ink jet printers are made by several companies. Hewlett Packard's family of portable ink-jet printers is a well known example. Thermal ink jet printing uses thermal excitation to fire (i.e., eject) drops (also called dots) of ink through tiny orifices, to print text or pictures. FIG. 1 shows characters printed by means of such ink dots.

A key component of the ink jet printer is the ink jet cartridge. The Hewlett Packard ink jet cartridge is one type. It is a disposable unit 20 which is total self-contained (FIG. 2). The cartridge consists of a liquid ink supply in a bladder 21, twelve nozzles 22*a*, 22*b*, etc., and twelve thin film resistors (not shown). The resistors are located directly below each nozzle 22*a*, 22*b*, etc. Each nozzle 22*a* can supply a drop of ink on demand by energizing the corresponding resistor. The drop ejection process begins by heating the resistor with a short electrical pulse. Within a few microseconds, the ink above the resistor is vaporized. The vapor bubble grows rapidly and imparts momentum to the ink above the bubble. Some of this ink is ejected through the nozzle 22*a* at velocities exceeding ten meters per second. The nozzle 22*a* is then automatically refilled with ink by capillary action.

The ink supply is contained in a synthetic rubber bladder 21 located immediately behind the printhead substrate 23. The bladder 21 is designed to maintain a relatively constant back pressure at the nozzles 22*a* so ink is only expelled when desired. The bladder 21 also provides a very crude visual indication of the amount of remaining ink, because the bladder 21 collapses as ink is used. Ink flow from the bladder 21 to the nozzles 22*a* is by capillary action, and is relatively independent of the print cartridge 20 orientation. The bladder 21 contains enough ink to print some approximate number of dots, about ten million dots in the case of the Hewlett Packard cartridge. The prior art method of determining when the bladder 21 is out of ink is simple. If the print cartridge 20 fails to print, and the bladder 21 looks collapsed, the print cartridge 20 is out of ink and needs replacement. Priming the print cartridge (i.e., quickly printing several dots from each nozzle) may temporarily restore printing (because of a small amount of residual ink in the bladder 21), but printing will only continue for a few hundred more characters.

The cartridge 20 also includes locating pins 24, cover 25, resistor array electrical contacts 26*a*, 26*b*, etc., and body 27. The prior art printers are typically controlled by a computer program installed in ROM (Read Only Memory) in a microcontroller in the printer.

In its product literature, Hewlett Packard suggests an alternate procedure for detecting loss of print (i.e., ink exhaustion), by using an optical sensor, presumably by sensing a loss of dark (printed) areas on the paper. No details are provided.

However, this prior art method does not provide any warning before the ink supply is exhausted. In the typical personal computer application, loss of ink supply is not so serious, since each document is usually short and the printer is under operator control. When the printer is used in an industrial or scientific application such as for recording data from instrumentation and operates unattended, loss of printing is a significant problem.

Therefore, there is a need for a way to anticipate the exhaustion of the ink supply in the bladder, so as to warn the operator to install a fresh cartridge.

SUMMARY OF THE INVENTION

In accordance with the present invention, an ink jet printer counts the number of ink dots fired from an ink jet cartridge (i.e., an ink supply). When a certain number of dots have been fired, an indication is provided to the user. Typically, the indication will be provided after the number of ink dots corresponding to a number near to the capacity (i.e., the useful life) of the cartridge is counted, so the cartridge can be changed before it runs dry.

The invention is preferably implemented by means of a computer program resident in the printer's microcontroller, complemented by a computer program resident in the host computer. The host computer can be scientific or other instrumentation having a computer or microprocessor as a central processing unit (CPU). The microcontroller in the printer preferably uses nonvolatile memory (RAM) in the host computer, which is connected to the printer and whose output the printer is printing, to keep the ink dot count.

The indication preferably is a message printed by the printer that the cartridge should be replaced, but alternatively or in addition is some other indication, such as on an LCD display.

BRIEF DESCRIPTION OF THE DRAWINGS

FIGS. 3A, 3B. 3C and 3D show the relevant parts of the program for the printer in assembly language in accordance with one emodiment of the present invention.

FIG. 3E shows the relevant parts of the program for the host system in assembly language and BASIC in accordance with one embodiment of the present invention.

DETAILED DESCRIPTION OF THE INVENTION

In accordance with the present invention, the preferred embodiment of the invention is implemented in an ink jet printer using the Hewlett Packard Thermal Ink-jet print cartridge (Part No. HP 92261A). The printer is connected by well known means to a host computer system or instrumentation in the preferred embodiment, so as to print or plot the data output by the host.

In the preferred embodiment the present invention is implemented by a program which is written in assembly language and installed in the ROM (read only memory) of a conventional 8052 type eight bit microcontroller (of the 8031 microcontroller family) in the printer. The preferred embodiment also includes a program written in assembly language and BASIC and installed in the host computer, which in the preferred embodiment has a Z-80 microprocessor as the central processing unit. The sections of the computer programs which implement the present invention are shown in FIGS. 3A to 3E.

Figure 1:
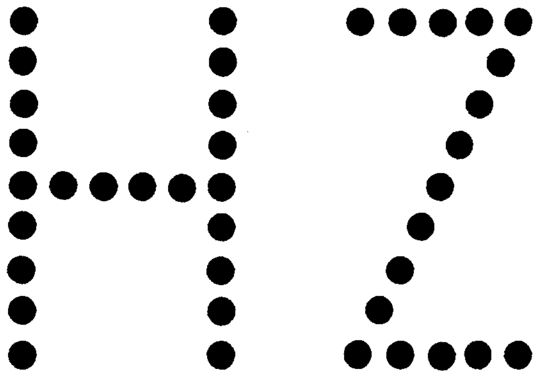
FIG. 1 shows the ink dots forming text characters in ink jet printing in the prior art.
Figure 2:
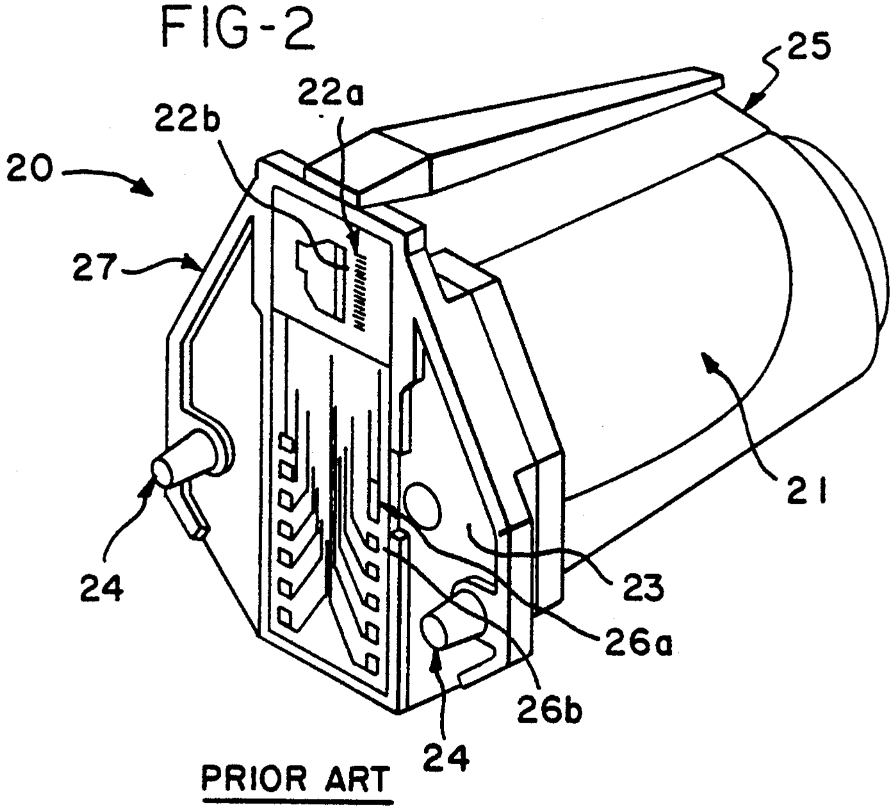
PRIOR ART FIG-2
FIG. 2 shows a typical prior art ink jet cartridge.
Figure 4:
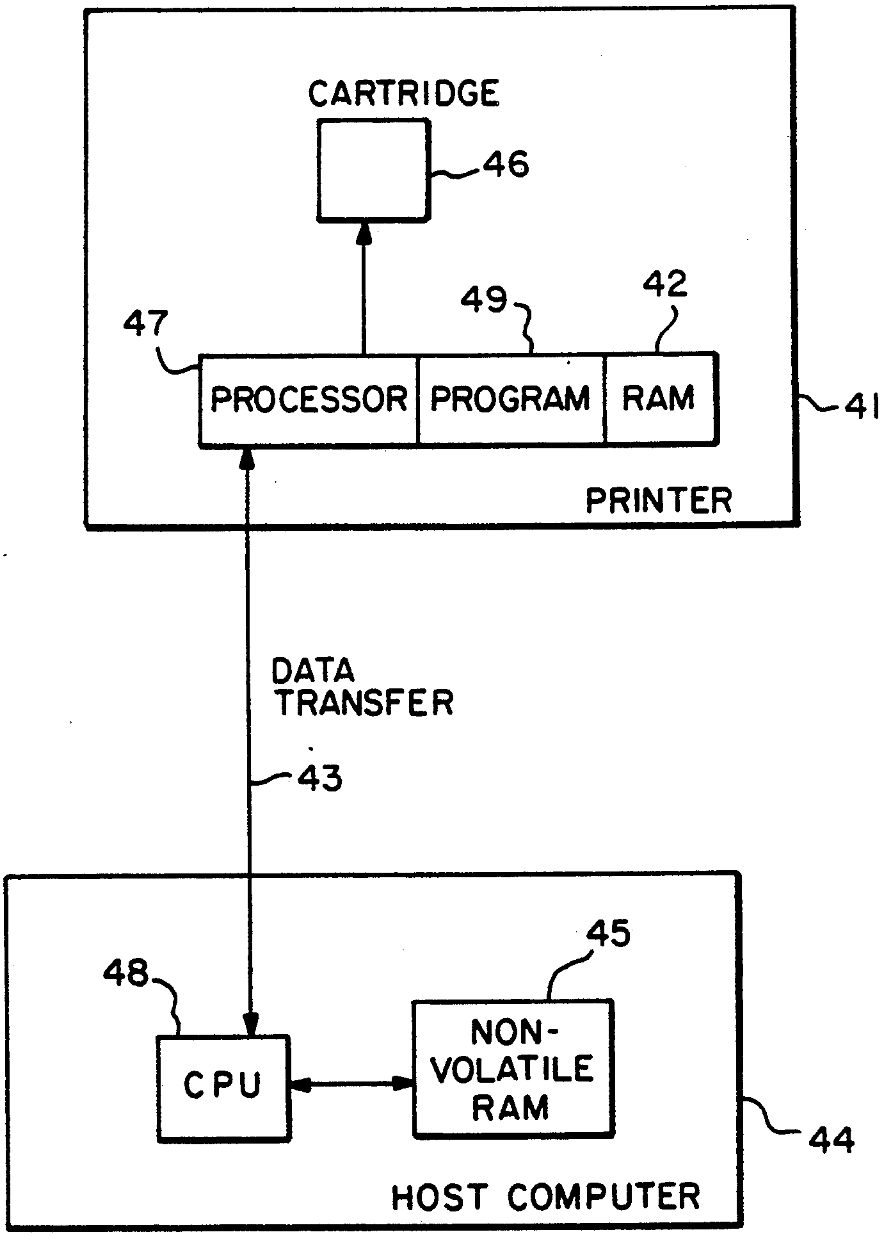
FIG. 4 shows schematically one embodiment of the present invention.

The nature of the programs are dictated by two constraints of the system, as seen in FIG. 4.

1. The printer 41 typically does not have nonvolatile memory but has only volatile RAM (random access memory) 42, so it can keep a count only when powered on;

2. The data transfer 43 capability from the printer 41 back to the host computer system 44 is limited.

Therefore, in the preferred embodiment, the main count of ink dots fired is kept in the nonvolatile RAM 45 in the host computer 44. This means that in order for the ink dot count to be meaningful, the particular ink cartridge 46 must be kept in one printer 41 that is connected to the same host computer 44 for the life of the cartridge.

The limited data transfer 43 capability from printer to computer dictates that the actual dot counting be done by the printer microcontroller 47. The printer microcontroller counts ink dots in its RAM 42 up until 4,096 dots are counted. This number is equal to $2^{12}$, and so the count is conveniently kept in registers in the microcontroller. At that point, the microcontroller 47 writes out, from its status register, one bit on the status line to the host computer 44. That bit acts as a flag, and that flag is a signal to the host computer CPU 48 to add one count to its count in nonvolatile RAM 45, upon the next data transfer from the host computer 48 to the printer microcontroller 47. When the next dot is counted the flag is turned off, the microcontroller 47 decrements its count by 4,096, and continues counting.

The host system dot count is multiplied by 4,096 (which is 1000 hex count) to get the total number of dots fired. When that total number exceeds ten million, then when the current page or chart being printed is completed, a message is printed by printer 41 on the page telling the user to change the ink cartridge 46. The message also instructs the user to type into the host computer 44 a certain key combination which tells the microcontroller 47 that a new cartridge 46 has been provided, so that the count in the host computer 48 can be reset to zero. Note that the dot count in the printer is reset to zero whenever the printer is powered off. This will typically lead to small and inconsequential errors in the dot counting. The program 49 is shown as being part of microcontroller 47, where program 49 is preferably installed in ROM, as described above.

The basis of a nominal ten million dot life of the cartridge 46 is that each dot is a uniform amount of ink and that experimentation indicates that each cartridge actually produces twelve million dots, or more.

Figure 5:
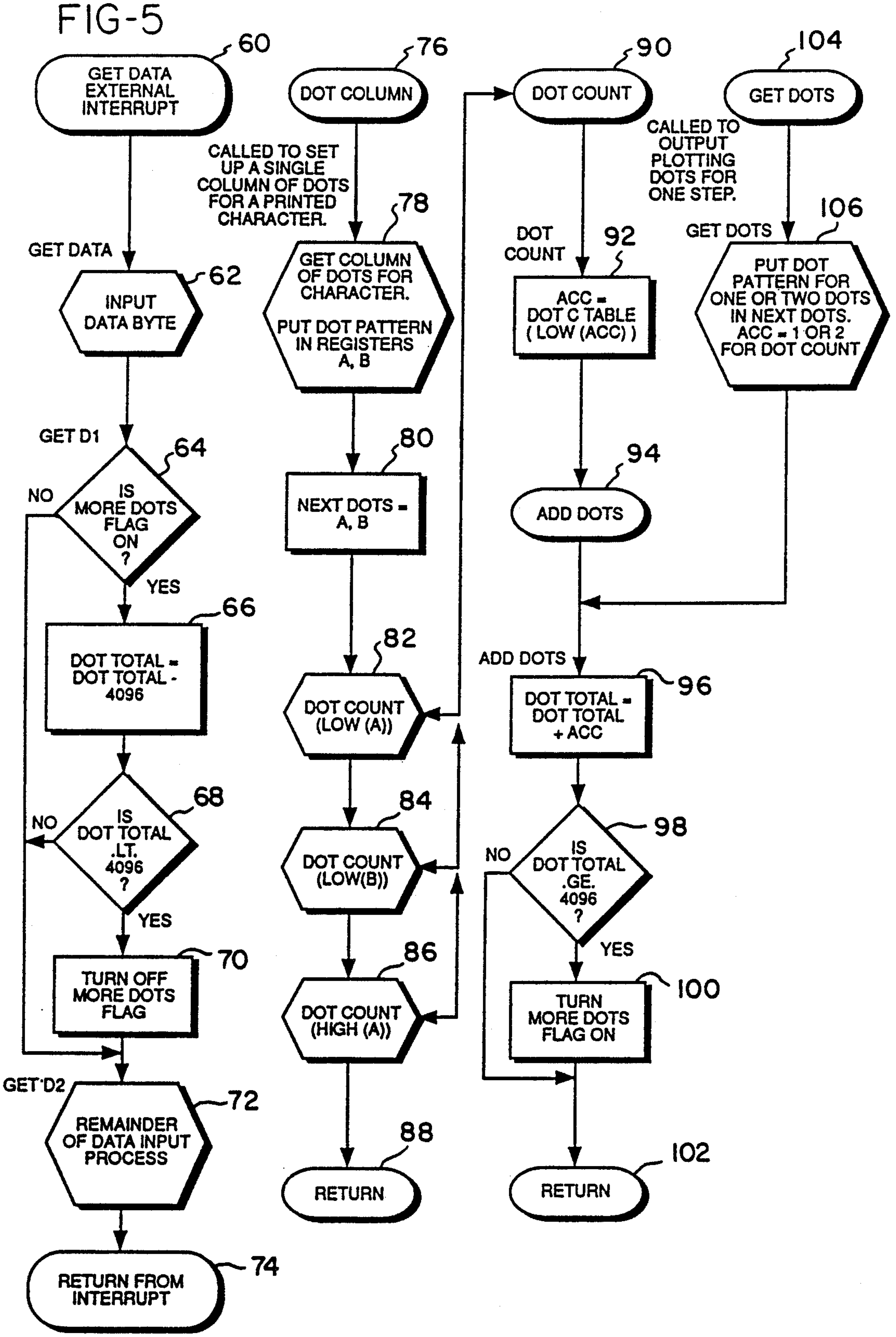
FIG. 5 shows the assembly language program of FIGS. 3A to 3D in flowchart form.

In the preferred embodiment of the invention as shown in FIG. 5 in flowchart format, the key variable is MOREDOTS which if on is transmitted as a bit on the status line to the host computer CPU. When MOREDOTS (a flag variable) is on, the host computer adds one to its ink count. When the host computer CPU count exceeds a certain amount (i.e., 10,000,000/4,096=2,441), the host computer CPU indicates to the user the need to install a fresh ink cartridge.

The normal flow in FIG. 5 begins at the upper left at GETDATA at 60 which is a conventional printer control routine to input data to the printer at 62. Then subroutine GETD1 at 64 checks whether the MOREDOTS flag is on. If it is on, then DOT TOTAL is decremented by 4,096 at 66, and DOT TOTAL is checked whether it is less than 4,096 at 68. If so, then the MOREDOTS flag is turned off at 70, and the remainder of the data is input by GETD2 at 72, followed by a return at 74. If the MOREDOTS flag was not on at 64, (meaning that the DOT TOTAL was less than 4,096), then the program goes directly to 72.

The second column of the flowchart starts with DOTCOLUMN at 76, which is a conventional printer control routine which sets up a single column of dots for a printed character at 78. Registers A and B in 80, 82, 84, 86 together contain a one for each of the twelve dots in the column which is on and a zero for each dot that is off.

DOTCOLUMN at 86 then calls DOTCOUNT three times, once for each group of four dots. DOTCOUNT at 90 adds the number of dots in the low nibble of the accumulator ACC to DOT TOTAL at 92. The low nibble of the accumulator is used to address the table DOCTCTABLE (not shown in the flowchart), and ADDDOTS is called at 94.

ADDDOTS at 96 adds the accumulator value of DOT TOTAL. Then DOT TOTAL is checked at 98 for a value greater than 4,096. IF so, the MOREDOTS flag is turned on at 100. If not, the flag is not turned on, and return is executed at 102.

The GETDOTS subroutine at 104 is a conventional printer control subroutine which is called to output plotting data for the next plotting step. GETDOTS operates at 106 so as to count the dots when double dots are being printed by means of a double dot flag; the result is then supplied to ADDDOTS at 96.

FIGS. 3A, 3B, 3C, and 3D show in detail those microcontroller subroutines which are relevant to the method of the present invention. FIG. 3E shows the complementing host computer programs relevant to the present invention. Subroutine KXMITO keeps the dot count in variable INKCOUNT, and when the dot count exceeds the specified number, a one line routine is called to direct the printer to print the message that reads "INK LOW—CHANGE PRINT CARTRIDGE AND PRESS [CTRL-SHIFT-C]," and this routine (written in BASIC) also optionally provides an indication on an LCD display on the host computer. If the operator complies and presses the indicated key combination, the second routine written in BASIC then prints out "INK COUNTER IS RESET" and decrements the host computer ink dot count to zero.

The assembly language program of FIGS. 3A, 3B, 3C, 3D operates as described above with reference to the flowchart in FIG. 5.

The present invention can be implemented with many variations from the preferred embodiment applicable to any ink jet printer using a cartridge or other replaceable ink supply means. If the printer has nonvolatile memory, then the entire invention could be implemented in the printer. For some printers, the entire counting process could be carried out in the host computer if there is a full two-way printer-CPU data channel. Such an implementation would not be feasible for the typical system, due to the limited ability of the printer to transmit data back to the host computer. In another embodiment, one host computer could keep track of the status of several printer cartridges in different printers. If the ink dots are nonuniform, but in a consistent way, the program in accordance with the present invention could account for the nonuniformity so as to keep accurate track of the ink used.

The above-described embodiment therefore is intended to be illustrative and not limiting. Further embodiments of the invention will be obvious to one of ordinary skill in the art in the light of the above disclosure.

I claim:

1. A method to determine a status of an ink supply and to replace the ink supply in an ink jet printer comprising the steps of:
- installing the ink supply in the ink jet printer;
- digitally counting a number of ink dots fired from the ink supply;
- providing an indication of the status of the ink supply based upon the count; and
- installing another ink supply in response to a particular status indication.

2. The method of claim 1, wherein both the steps of counting and providing are performed by a computer program.

3. The method of claim 2, further comprising the step of keeping the count of the number of ink dots fired in a nonvolatile memory.

4. The method of claim 3, wherein the nonvolatile memory is in a computer operatively connected to the printer.

5. The method of claim 1, wherein the step of installing another ink supply further comprises the step of reinitializing the count.

6. The method of claim 1, wherein the step of providing the indication comprises the step of printing a message by the printer.

7. The method of claim 1, wherein the indication is provided after a predetermined number of dots has been counted in the step of counting.

8. The method of claim 1, wherein the step of providing the indication comprises the step of providing the indication on a liquid crystal display.

9. The method of claim 1, wherein the ink supply is a thermal ink-jet cartridge.

10. A device to determine a status of an ink supply for an ink jet printer comprising:
- means for digitally counting a number of ink dots fired from the ink supply after the installation of the ink supply;
- means for providing an indication of the status of the ink supply based upon the count; and
- means for reinitializing the count upon provision of another ink supply.

11. The device of claim 10, further comprising means for keeping the count of the number of ink dots fired in a nonvolatile memory.

12. The device of claim 11, wherein the nonvolatile memory is in a computer connected to the printer.

13. The device of claim 12, wherein the indication is provided at system initialization of the computer.

14. The device of claim 12, wherein the indication of the status is a response to a status inquiry in the computer.

15. The device of claim 10, wherein the means for counting the number of ink dots comprises means for determining the characters printed from the ink supply.

16. The device of claim 15, wherein the means for determining counts the dots sequentially in each column of each character.

17. The device of claim 10, wherein at least part of the computer program is installed in a microcontroller in the printer.

18. The device of claim 17, wherein the computer program comprises an assembly language program installed in the microcontroller.

19. The device of claim 17, wherein the computer program comprises means for signalling the computer after a predetermined number of dots are counted by the computer program.

20. The device of claim 10, wherein the means for providing an indication comprises means for printing a message to the user of the ink jet printer.

21. The device of claim 10, wherein the indication is provided after a predetermined number of dots has been counted by the means for counting.

22. The device of claim 10, wherein the means for providing the indication comprises a liquid crystal display.

23. The device of claim 10, wherein the ink supply is an ink jet cartridge.

24. A method to indicate a useful life of an ink jet cartridge for a printer comprising the steps of:
- installing the ink jet cartridge in the printer;
- determining the characters printed by the ink jet cartridge;
- counting the dots sequentially in each column of each character;
- keeping the count of the number of dots in a nonvolatile memory;
- providing an indicator to a user of the remaining life of the cartridge when the count reaches a predetermined value;
- installing another ink jet cartridge in response to the indication; and
- reinitializing the count.

25. A method to determine a status of an ink supply and to replace the ink supply in an ink jet printer comprising the steps of:
- installing the ink supply in the ink jet printer;
- counting a number of ink dots fired from the ink supply, wherein the step of counting the number of ink dots comprises the step of determining the characters printed by the ink jet printer from the ink supply;
- providing an indication of the status of the ink supply based upon the count, wherein both the steps of counting and providing are performed by a computer program; and
- installing another ink supply in response to a particular status indication.

26. The method of claim 26 wherein the step of determining includes the step of counting the dots sequentially in each column of each character.

27. A method to determine a status of an ink supply and to replace the ink supply in an ink jet printer comprising the steps of:
- installing the ink supply in the ink jet printer;
- counting a number of ink dots fired from the ink supply;
- providing an indication of the status of the ink supply based upon the count, wherein the indication is provided after a predetermined number of ink dots has been counted in the step of counting and wherein the predetermined number of ink dots is about ten million; and installing another ink supply in response to a particular status indication.

28. A method to determine a status of an ink supply and to replace the ink supply in an ink jet printer comprising the steps of:

installing the ink supply in the ink jet printer;

counting a number of ink dots fired from the ink supply;

providing an indication of the status of the ink supply based upon the count, wherein both the steps of counting and providing are performed by a computer program and wherein at least part of the computer program is installed in a microcontroller in the ink jet printer; and installing another ink supply in response to a particular status indication.

29. The method of claim 28, wherein the computer program comprises an assembly language program installed in the microcontroller.

30. A method to determine a status of an ink supply and to replace the ink supply in an ink jet printer comprising the steps of:

installing the ink supply in the ink jet printer;

counting a number of ink dots fired from the ink supply, wherein both the steps of counting and providing are performed by a computer program;

keeping the count of the number of ink dots fired in a nonvolatile memory, wherein the nonvolatile memory is in a computer operatively connected to the ink jet printer;

providing an indication of the status of the ink supply based upon the count, wherein the step of providing the indication is at system initialization of the computer; and installing another ink supply in response to a particular status indication.

31. A method of determine a status of an ink supply and to replace the ink supply in an ink jet printer comprising the steps of:

installing the ink supply in the ink jet printer;

counting a number of ink dots fired from the ink supply, wherein both the steps of counting and providing are performed by a computer program;

keeping the count of the number of ink dots fired in a nonvolatile memory, wherein the nonvolatile memory is in a computer operatively connected to the ink jet printer;

providing an indication of the status of the ink supply based upon the count, wherein the step of providing the indication is a response to a status inquiry in the computer; and installing another ink supply in response to a particular status indication.

32. A device to determine a status of an ink supply for an ink jet printer comprising:

means for counting a number of ink dots fired from the ink supply after the installation of the ink supply;

means for providing an indication of the status of the ink supply based upon the count, wherein both the means for counting and providing comprise a computer program; and means for reinitializing the count upon provision of another ink supply.

33. A device to determine a status of an ink supply for an ink jet printer comprising:

means for counting a number of ink dots fired from the ink supply after the installation of the ink supply;

means for providing an indication of the status of the ink supply based upon the count, wherein the indication is provided after a predetermined number of dots has been counted by the means for counting; and wherein the predetermined number of dots is about ten million; and means for reinitializing the count upon provision of another ink supply.

* * * * *